United States Patent
Chang et al.

(10) Patent No.: US 7,035,219 B2
(45) Date of Patent: Apr. 25, 2006

(54) PROVISIONING SYNCHRONOUS TRANSPORT RESOURCES FOR ASYNCHRONOUS TRAFFIC

(75) Inventors: Ted D. Chang, Richardson, TX (US); Steve G Pelosi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 930 days.

(21) Appl. No.: 09/957,892

(22) Filed: Sep. 21, 2001

(65) Prior Publication Data

US 2003/0061392 A1    Mar. 27, 2003

(51) Int. Cl.
*G06F 11/00* (2006.01)
*H04L 12/28* (2006.01)

(52) U.S. Cl. ............... 370/236; 370/395.41; 370/397; 370/404; 709/238

(58) Field of Classification Search .......... 370/230.1, 370/236, 395.41, 397, 404, 467, 543, 906, 370/406; 709/232, 238
See application file for complete search history.

(56) References Cited

U.S. PATENT DOCUMENTS

| | | | | |
|---|---|---|---|---|
| 6,014,708 A | * | 1/2000 | Klish | 709/232 |
| 6,587,470 B1 | * | 7/2003 | Elliot et al. | 370/404 |
| 6,650,646 B1 | * | 11/2003 | Galway et al. | 370/397 |
| 6,738,825 B1 | * | 5/2004 | Bortolotto et al. | 709/238 |
| 6,888,798 B1 | * | 5/2005 | Jamieson et al. | 370/236 |

* cited by examiner

*Primary Examiner*—Afsar Qureshi
(74) *Attorney, Agent, or Firm*—Baker Botts L.L.P.

(57) ABSTRACT

A communication system includes multiple network interfaces interconnected using synchronous transport resources, such as a SONET ring. These interfaces couple to various communications networks and provide access for these networks to the synchronous transport resources. In response to relatively simple commands, these interfaces may couple attached asynchronous networks to the synchronous transport resources. With appropriate messages communicated to two of these interfaces, this system provides for the provisioning of synchronous transport resources between two asynchronous networks to support network-to-network communications.

29 Claims, 3 Drawing Sheets

PROVISIONING SYNCHRONOUS TRANSPORT RESOURCES FOR ASYNCHRONOUS TRAFFIC

TECHNICAL FIELD OF THE INVENTION

The present invention relates generally to the provisioning of transport resources and, more particularly, to the provisioning of synchronous transport resources for asynchronous traffic.

BACKGROUND OF THE INVENTION

The proliferation of numerous, disparate technologies for transporting communications has increased the complexity of network management. Network administrators often must struggle with complicated procedures to integrate various types of communications networks. Further complicating network integration, archaic transport management systems often operate using standards that fail to contemplate existing and widespread technologies. Thus, administrators must often bypass these "unaware" systems and use complex techniques to directly link various systems.

SUMMARY OF THE INVENTION

In accordance with the present invention, techniques for provisioning synchronous transport resources for asynchronous traffic are provided which substantially eliminate or reduce disadvantages and problems associated with previous techniques. In a particular embodiment, the present invention satisfies a need for a relatively simply technique for provisioning synchronous transport resources to link two separate networks implementing asynchronous transport protocols.

According to a particular embodiment, a method for provisioning synchronous transport resources for linking Ethernet networks receives a provisioning message that identifies a selected one out of multiple Ethernet ports on an Ethernet interface, selects one out of multiple synchronous transport signal (STS) links on the Ethernet interface, and couples the selected Ethernet port and the selected STS link. The method further receives a cross-connect message that identifies the selected Ethernet port and an optical link, determines the selected STS link based on the selected Ethernet port, and couples the selected STS link and the optical link, such that asynchronous electrical traffic received at the selected Ethernet port is transmitted as synchronous optical traffic on the optical link, and synchronous optical traffic received at the optical link is transmitted as asynchronous electrical traffic on the selected Ethernet port.

Embodiments of the invention provide various technical advantages. These techniques provide an elegant solution that, through a coordination of various system elements, can link asynchronous networks across a synchronous transport fabric. In particular embodiments, these techniques provide for the linking of two Ethernet networks across a synchronous optical network (SONET) to permit the Ethernet networks to function as a single Ethernet network. Various embodiments of the invention further allow the use of existing command structures and techniques for the provisioning of transport resources. For example, by issuing two commands (provision resource and cross-connect the provisioned resource) to each of two locations on a SONET ring, a system implementing these techniques may link two asynchronous networks over the synchronous transport fabric.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
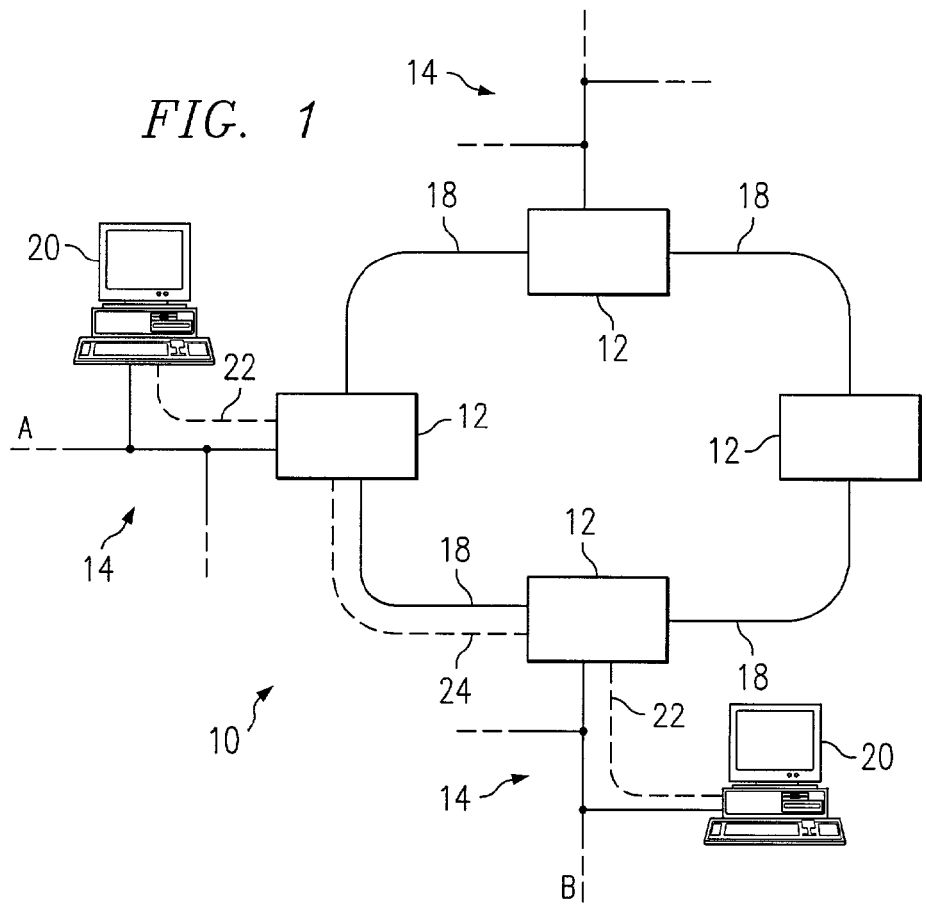
FIG. 1 illustrates a communication system that includes network nodes for providing synchronous transport resources to link asynchronous networks according to the present invention.

FIG. 1 illustrates a communication system, indicated generally at 10, that includes network nodes 12 coupled to each other using a synchronous transport ring 18, with each network node 12 in turn coupling to other synchronous and/or asynchronous networks, such as Ethernet networks 14. In general, nodes 12 support provisioning of synchronous transport resources to link asynchronous networks. In specific embodiments, nodes 12, upon receiving relatively simple commands, can establish a link between two Ethernet networks 14 across synchronous transport ring 18.

Nodes 12 represent hardware and associated logic for interconnecting various networks. For example, nodes 12 may represent functionality performed by equipment such as add/drop multiplexers, SONET-based multiprotocol switches, or other suitable components of system 10. In the embodiment illustrated, nodes 12 act as hubs for ring 18 and transport information to and from other nodes 12 to provide connectivity between elements and networks coupled to nodes 12. According to particular embodiments, system 10 implements ring 18 as a synchronous optical network (SONET) ring. Using ring 18, nodes 12 support links between asynchronous networks, such as Ethernet networks 14. To provide these links, nodes 12 respond to relatively simple commands for provisioning resources and linking the provisioned resources across ring 18.

For example, consider Ethernet networks 14 labeled A and B (network A and network B), each having one or more communications devices 20. Without a link between them, these networks A and B function as separate Ethernet networks, with devices in each unable to communicate with devices in the other. However, nodes 12 can be instructed to link these asynchronous networks using synchronous transport resources. According to particular embodiments, a management system instructs node 12 coupled to network A to provision a port that communicates with network A and then instructs that node 12 to cross-connect the provisioned port to an optical interface linked to ring 18. Similarly, the management system instructs node 12 coupled to network B to provision a port that communicates with network B and then instructs that node 12 to cross-connect the provisioned port to an optical interface linked to ring 18. In response to these relatively simple commands, a network-to-network link is established coupling network A and network B. As a result of these commands, asynchronous traffic 22 may be transported between network A and network B as synchronous traffic 24 using ring 18. This permits communications devices 20 in networks A and B to carry on communications as if within a common Ethernet network.

Figure 2:
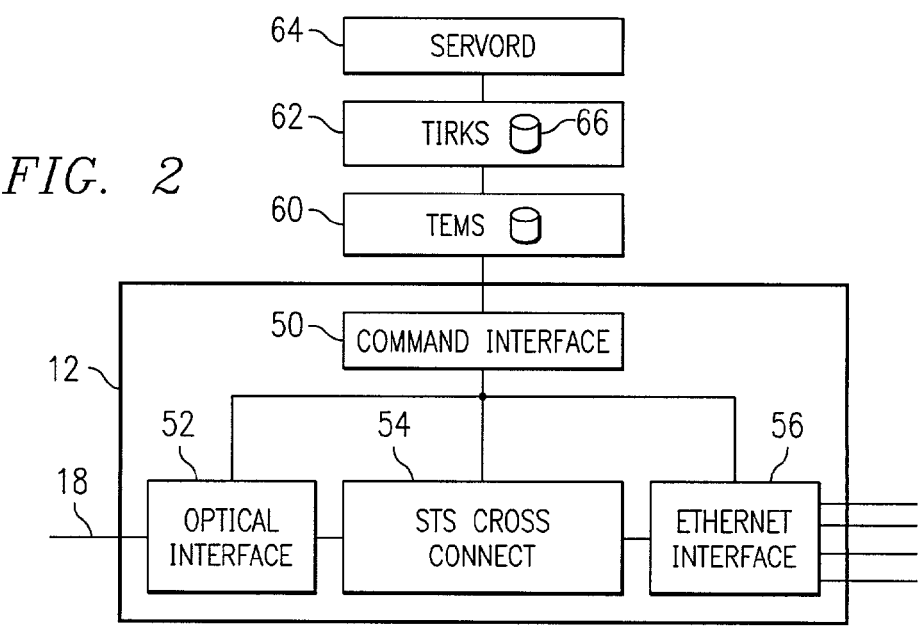
FIG. 2 is a block diagram illustrating functional modules of an exemplary network node and associated command systems.

FIG. 2 is a block diagram illustrating components of an exemplary node 12 that includes a command interface 50, an optical interface 52, a synchronous transport signal (STS) cross-connect module 54, and an Ethernet interface 56. In addition, FIG. 2 illustrates exemplary management systems for managing the operation of node 12, including a transport element management system (TEMS) 60, a trunk integrated recordkeeping system (TIRKS) 62, and a service order (SERVORD) terminal 64. In general, node 12 couples to other networks, such as Ethernet networks 14, and provides links for these other networks to the transport resources of ring 18. More specifically, in response to relatively simple commands, node 12 can link networks implementing asynchronous transport protocols, such as Ethernet networks 14, to the synchronous transport resources available on ring 18. For example, node 12 can establish a link between an asynchronous network, such as Ethernet network 14, and synchronous transport resources of ring 18, in response to two commands, a provisioning message and a cross-connect message.

Elements of node 12, including command interface 50, optical interface 52, cross-connect module 54, and Ethernet interface 56, represent hardware and associated logic for interfacing with various networks and for coupling communications between these networks. Ethernet interface 56 includes one or more Ethernet ports for wireless and/or wireline connections with Ethernet networks 14. Ethernet interface 56 also provides multiple STS links for communications with synchronous transport resources, for example, to link to cross-connect module 54. In response to a single command, Ethernet interface 56 couples an Ethernet port to at least one of the STS links. When coupled, Ethernet interface 56 provides translation, buffering, and other tasks to interface between the synchronous communications of the STS links and the asynchronous communications of the Ethernet ports. Thus, coupling refers to any logical or physical association or mapping resulting in a link between these elements.

Optical interface 52 provides one or more high-speed optical links to ring 18. These links may include various channels, timeslots, and/or wavelengths on one or more optical lines or other suitable links for interfacing to optical communications resources. For example, optical interface 52 may be an optical carrier interface device, such as OC-3, OC-12, and/or other appropriate optical interfaces. Cross-connect module 54 provides a link between Ethernet interface 56 and optical interface 52. In response to a single command, cross-connect module 54 can couple one of the STS links of Ethernet interface 56 to one of the high speed optical links of optical interface 52. In particular embodiments, cross-connect module 54 responds to a command identifying an Ethernet port on Ethernet interface 56 and an optical link on optical interface 52 by identifying the appropriate STS links on Ethernet interface 56 and coupling these STS links to the identified optical link on optical interface 52.

Command interface 50 provides a link to various administrators and management systems to support the administration and management of node 12. Thus, through command interface 50, elements of node 12 may receive various commands and messages. In the embodiment illustrated, command interface 50 couples to TEMS 60, which in turn couples to TIRKS 62 and service order terminal 64. According to particular embodiments, TEMS 60, TIRKS 62, and terminal 64 operate according to the standards promulgated by Telcordia. Terminal 64 provides access for an administrator and/or other suitable manager to request the configuration of elements within a communications network. For example, using terminal 64, an administrator may request a link to provide a specified bandwidth between network A and network B.

TIRKS 62 typically acts as a server to interact with administrators through terminals 64. To service requests received using terminal 64, TIRKS 62 maintains a network configuration database 66 that stores information on network elements and circuits linking these elements. Using the information in network configuration database 66, TIRKS 62 designs the appropriate connections, such as determining specific ports to link, to effect the link indicated in the request received from terminal 64. For example, using network configuration database 66, TIRKS 62 may determine ports on particular network elements to be linked to provide the services requested using terminal 64.

Based on the particular network elements and circuits selected by TIRKS 62, TEMS 60 forms commands and issues these commands to appropriate network elements. Thus, TEMS 60 serves as a connection and translation unit to implement the configurations designed by TIRKS 62. According to particular embodiments, TEMS 60 forms and issues transaction language 1 (TL1) commands to network elements. However, system 10 contemplates management systems interacting with node 12 using any suitable messaging protocols. For example, an administrator may directly interface with node 12, for example, using a portable computer or other suitable interface, to send command messages or configurations to node 12.

To link network A and network B, TEMS 60 receives a design for this link from TIRKS 62, for example, an indication of two Ethernet ports to link across ring 18 and a bandwidth for the link. To link these networks, TEMS 60 issues commands to the two nodes 12 coupling network A and network B to ring 18. To each node 12, TEMS 60 issues a command to provision an Ethernet port and a command to couple the Ethernet port to an optical link. According to particular embodiments, TEMS 60 commands the provisioning and cross-connecting of the port using two messages per node 12. Thus, TEMS 60 can establish a network-to-network link with four total commands.

For example, consider the commands issued to one of the two nodes 12. TEMS 60 first issues a provisioning message through command interface 50 to Ethernet interface 56. This provisioning message identifies a particular Ethernet port and may also include information such as a bandwidth for the link. In response to the provisioning message, Ethernet interface 56 selects one (or more) of its STS links and couples the selected STS link and the identified Ethernet port. To provide a requested bandwidth, Ethernet interface 56 may select and couple multiple STS links to the identified Ethernet port. For example, a provisioning message requesting an STS3 link may result in Ethernet interface 56 coupling three STS links to the Ethernet port. When STS links and an Ethernet port are coupled, Ethernet interface 56 provides for the conversion between the asynchronous communications protocol used for communications on the Ethernet port and the synchronous communications protocol used for communications on the STS links. Therefore, in response to the provisioning message, Ethernet interface 56 establishes a link between the asynchronous network coupled to the Ethernet port and synchronous transport resources.

After issuing the provisioning message, TEMS 60 issues a cross-connect message through command interface 50 to cross-connect module 54. This cross-connect message identifies the same Ethernet port identified by the provisioning message as well as identifying an optical link in optical interface 52. Also, similar to the provisioning message, the cross-connect message may include additional information, such as a bandwidth for the link. Based on the Ethernet port identified in the cross-connect message (and potentially other factors, such as bandwidth) cross-connect module 54 determines the appropriate STS links of Ethernet interface 56 that are coupled to the identified Ethernet port. Cross-connect module 54 then cross-connects these STS links to the optical links specified by the cross-connect message. Thus, for this example, if network A were connected to the Ethernet port identified in the messages, this process would couple asynchronous traffic from network A on to the synchronous transport resources of ring 18. By issuing similar messages to a second node 12 connected to network B, TEMS 62 may establish a network-to-network link between network A and network B.

According to particular embodiments, system 10 implements node 12 as a collection of cards within a network equipment rack. For example, command interface 50, optical interface 52, cross-connect module 54, and Ethernet interface 56 may each represent cards within the rack. However, system 10 contemplates node 12 including any appropriate combination and arrangement of elements for linking asynchronous and synchronous networks in response to relatively simple commands. Thus, specific elements illustrated and functionalities described may be separated, combined, rearranged, or otherwise modified, and any of these functionalities may be implemented using logic encoded in media. Moreover, while the particular embodiment illustrated includes a single terminal 64, TIRKS 62, and TEMS 60, system 10 contemplates any number of terminals 64 accessing TIRKS 62, each TIRKS 62 controlling multiple TEMS 60, and each TEMS 60 controlling any number of network elements, such as components within node 12. Moreover, while the embodiment illustrated shows node 12 having particular functional modules, system 10 contemplates node 12 containing additional modules, such as elements for interfacing with other networks.

Figure 3:
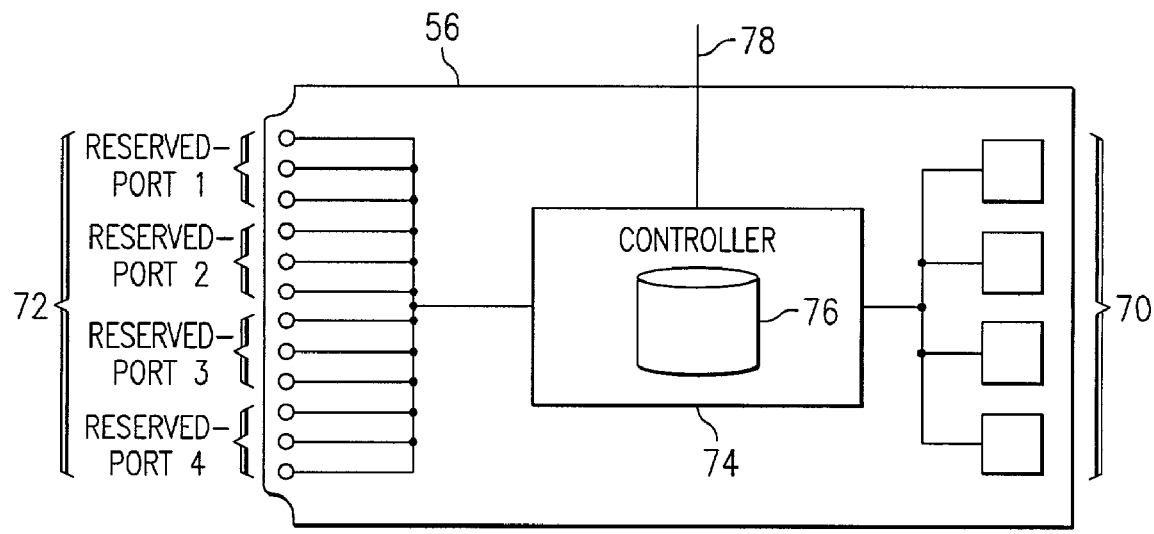
FIG. 3 is a block diagram illustrating functional components of an exemplary asynchronous/synchronous network interface module in the network node.

FIG. 3 is a block diagram illustrating functional components of an exemplary Ethernet interface 56 that includes Ethernet ports 70, STS links 72, and a control module 74. Ethernet interface 56 couples to asynchronous networks using Ethernet ports 70 and couples to synchronous transport resources using STS links 72. In general, Ethernet interface 56 provides access to synchronous transport resources by coupling Ethernet ports 70 to selected STS links 72 in response to messages received from administrators and/or management systems.

Ethernet ports 70 represent hardware and/or logic for interfacing with devices communicating using asynchronous communications protocols, such as devices within Ethernet networks 14. For example, Ethernet ports 70 may include slots for accepting RJ45 connectors. However, system 10 contemplates Ethernet ports 70 coupling to networks and communications devices using any suitable wireless and/or wireline communications technology. STS links 72 represent hardware and/or logic for coupling Ethernet interface 56 to synchronous transport resources, such as cross-connect module 54. According to a particular embodiment, Ethernet interface 56 is implemented as a network communications card and STS links couple to the backplane of a network equipment rack. However, system 10 contemplates Ethernet interface 56 using any suitable hardware and configuration of STS links 72 for coupling to synchronous transport resources.

Control module 74 manages the flow of communications into and out of Ethernet ports 70 and STS links 72. Moreover, in response to appropriate messages, control module 74 may couple Ethernet ports 70 to various STS links 72. For example, control module 74 may receive a provisioning message via a command line 78, with the provisioning message identifying one of Ethernet ports 70. In response to the message, control module 74 selects one of STS links 72 and couples the identified Ethernet port 70 and the selected STS link 72. This coupling establishes the necessary buffers and configurations for translating between asynchronous protocols used for the selected Ethernet port 70 and synchronous transport protocols used for the selected STS link 72. Moreover, control module 74 may couple an identified Ethernet port 70 to more than one STS link 72. For example, in response to the provisioning message, control module 74 may select multiple STS links 72 and couple the identified Ethernet port 70 to all of the selected STS links 72. Once coupled, control module 74 performs any timing adjustments, frame alignments, bit serialization, buffering, or other appropriate processing to distribute asynchronous traffic received on Ethernet ports 70 as synchronous traffic on one or more of the selected STS links 72. Likewise, control module 74 communicates synchronous traffic received on any of the coupled STS links 72 on Ethernet port 70.

To determine the appropriate number of STS links 72 for coupling to an identified Ethernet port 70, control module 74 may access predetermined settings and/or information contained in the provisioning message. For example, a provisioning message may, in addition to identifying one of Ethernet ports 70, specify a bandwidth. This bandwidth may indicate the number of STS links 72 for coupling to the identified Ethernet port 70. Thus, in response, control module 74 couples the appropriate number of STS links 72 to the identified Ethernet port 70. However, the bandwidth provided by selected STS links 72 need not precisely correspond to the available bandwidth of the identified Ethernet port 70. Yet if these bandwidths do not correspond, control module 74 may drop some communications during peak bandwidth usage.

To determine which of STS links 72 for coupling to an identified Ethernet port 70, control module 74 may use any appropriate criteria and/or information. According to a particular embodiment, control module 74 maintains link reservation information 76 that maps each Ethernet port 70 to "reserved" STS links 72. For example, according to the particular embodiment illustrated, link reservation information 76 reserves the first three STS links 72 for the first Ethernet port 70, the second three STS links 72 for the second Ethernet port 70, the third three STS links 72 for the third Ethernet port 70, and the final three STS links 72 for the fourth Ethernet port 70. Thus upon receiving a provisioning message identifying the first Ethernet port 70, control module 74 accesses link reservation information 76 to determine that at least one of the first three STS links 72 should be coupled to the first Ethernet port 70. When selecting a subset of reserved STS links 72, control module 74 may use predetermined criteria, such as an algorithm that selects the first of the reserved STS links 72, or link reservation information 76 may indicate the order of selecting among reserved STS links 72. For example, upon receiving a provisioning message identifying the first Ethernet port and specifying a bandwidth corresponding to a single STS link 72, control module 74 may select the first of STS links 72 reserved for the first Ethernet port 70.

While the particular embodiment illustrated and the preceding description focus on a particular combination and arrangement of functional elements within Ethernet interface 56, system 10 contemplates Ethernet interface 56 including any appropriate combination and arrangement of elements for coupling asynchronous and synchronous networks in response to various messages. Thus, specific elements illustrated and functionalities described may be separated, combined, rearranged, or otherwise modified, and any of these functionalities may be implemented using logic encoded in media.

Figure 4:
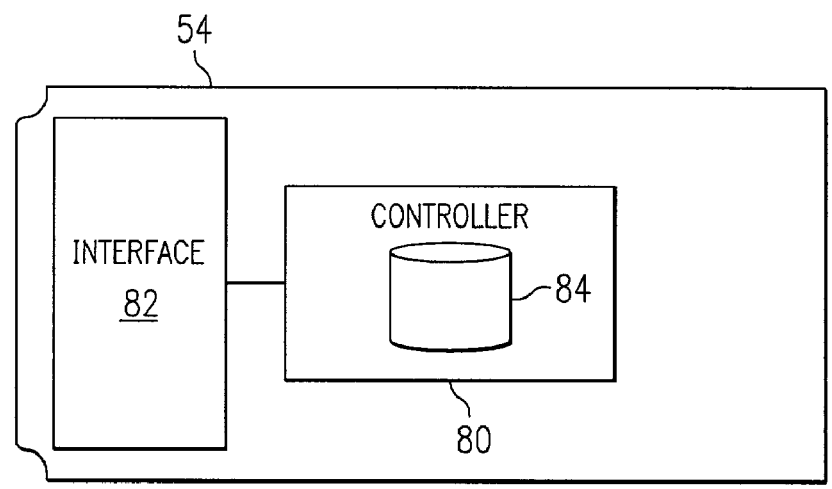
FIG. 4 is a block diagram illustrating functional components of an exemplary cross-connect module in the network node.

FIG. 4 is a block diagram illustrating functional elements of an exemplary cross-connect module 54 that includes a control module 80 and an interface 82. In general, cross-connect module 54 couples to various synchronous transport elements, such as STS links 72 of Ethernet interface 56 and optical links of optical interface 52, and couples these various synchronous transport elements in response to appropriate commands.

Controller 80 and interface 82 represent hardware and associated logic for performing the cross-connect functionalities of cross-connect module 54. Interface 82 couples cross-connect module 54 to synchronous transport elements, such as STS links 72 of Ethernet interface 56 and optical links of optical interface 52. For example, cross-connect module 54 may represent a network card, and interface 82 may couple to the backplane of a network equipment rack thus linking to other synchronous transport elements. Interface 82 also couples together various synchronous transport elements in response to commands from controller 80. For example, in response to an appropriate command, interface 82 may couple one of STS links 72 of Ethernet interface 56 to an optical link of optical interface 52.

Control module 80 processes messages received by cross-connect module 54 and manages the coupling of links within interface 82. For example, consider control module 80 receiving a cross-connect message identifying one of Ethernet ports 70 on Ethernet interface 56 and an optical link on optical interface 52. Based on the identified Ethernet port, control module 80 determines STS links 72 on Ethernet interface 56 coupled to the identified Ethernet port 70. According to particular embodiments, control module 80 maintains link reservation information 84, which includes a copy of link reservation information 76 maintained by Ethernet interface 56. Similar to the process used by Ethernet interface 56, control module 80 accesses link reservation information 84 based upon Ethernet port 70 identified in the cross-connect message to determine the appropriate STS links 72 on Ethernet interface 56. Moreover, as with the provisioning message sent to Ethernet interface 56, the cross-connect message received by cross-connect module 54 may specify a bandwidth or other information indicating multiple STS links 72 coupled to the identified Ethernet port 70. Upon determining the appropriate STS links 72, control module 80 instructs interface 82 to couple these STS links 72 to the optical link specified in the cross-connect message.

Thus, the actions of Ethernet interface 56 in response to a provisioning message and the actions of cross-connect module 54 in response to a cross-connect message result in a link between the asynchronous network coupled to Ethernet port 70 and the synchronous transport resources of ring 18.

However, while the particular example illustrated specifies control module 80 accessing link reservation information 84 to determine STS links 72 based on the identified Ethernet port 70, system 10 contemplates control module 80 using any appropriate processes, information, and criteria depending upon those used by Ethernet interface 56. For example, if Ethernet interface 56 uses dynamic criteria for selecting STS links 72, control module 80 of cross-connect module 54 may communicate with Ethernet interface 56 to determine the selected STS links 72. Thus, the particular method used by control module 80 for determining selected STS links 72 depends upon the techniques used by Ethernet interface 56.

Moreover, while the particular embodiment illustrated and the preceding description focus on a particular combination and arrangement of functional elements within cross-connect module 54, system 10 contemplates cross-connect module 54 including any appropriate combination and arrangement of elements for dynamically coupling various synchronous transport resources. Thus, specific elements illustrated and functionalities described may be separated, combined, rearranged, or otherwise modified, and any of these functionalities may be implemented using logic encoded in media.

Figure 5:
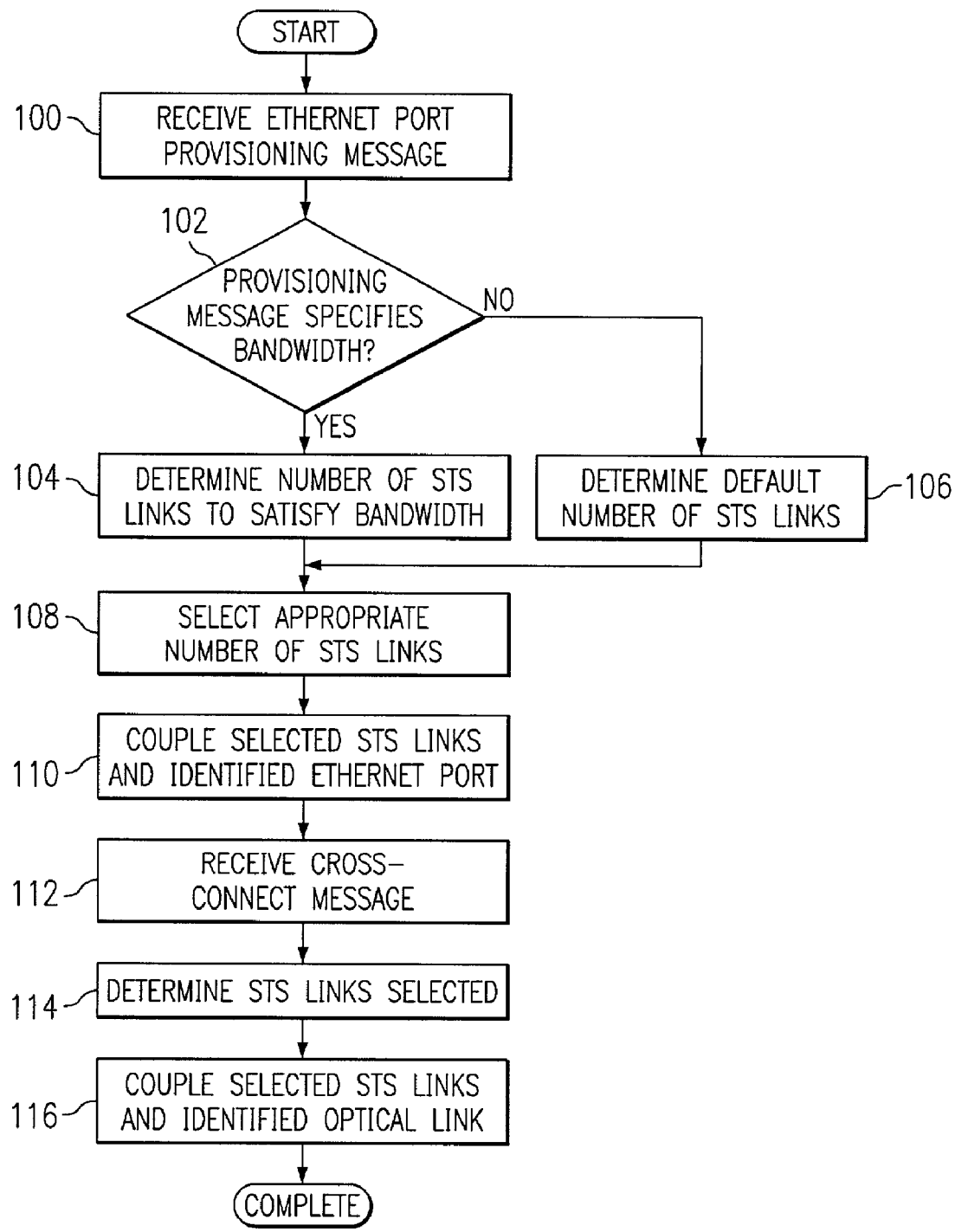
FIG. 5 is a flowchart illustrating a method for linking asynchronous networks through the provisioning of synchronous transport resources.

FIG. 5 is a flowchart illustrating a method for linking an asynchronous network to synchronous transport resources in response to a provisioning message and a cross-connect message. As previously discussed, system 10 contemplates any suitable combination and arrangement or hardware and/or logic components processing these messages to link asynchronous and synchronous resources. However, the following description will focus on the operation of Ethernet interface 56 in handling the provisioning message and cross-connect module 54 in handling the cross-connect message.

Ethernet interface 56 receives an Ethernet port provisioning message at step 100. As previously discussed, this message identifies one of Ethernet ports 70 and may include additional information, such as a specified bandwidth. Ethernet interface 56 determines whether the provisioning message specifies a bandwidth at step 102. If so, Ethernet interface 56 determines the number of STS links 72 for satisfying the specified bandwidth at step 104. If the provisioning message does not specify a bandwidth, Ethernet interface 56 may determine a default number of STS links 72 at step 106. For example, in the absence of a specified bandwidth, Ethernet interface 56 may select one of STS links 72.

Ethernet interface 56 selects the appropriate number (as determined in previous steps) of STS links 72 at step 108. For example, to select STS links 72, control module 74 of Ethernet interface 56 may access link reservation information 76 to determine STS links 72 reserved for Ethernet port 70 identified in the provisioning message. After selecting and/or determining the appropriate STS links 72, Ethernet interface 56 couples these selected STS links 72 and Ethernet port 70 identified by the provisioning message at step 110. As previously discussed, this coupling results in Ethernet interface 56 linking asynchronous traffic communicated by Ethernet port 70 and synchronous traffic communicated by STS links 72.

Cross-connect module 54 receives a cross-connect message at step 112. As previously discussed, this cross-connect message identifies one of Ethernet ports 70 on Ethernet interface 56 and an optical link on optical interface 52. More specifically, the cross-connect message identifies the same Ethernet port 70 identified in the provisioning message handled by Ethernet interface 56. The cross-connect message may also specify other information, such as a bandwidth for the link.

Cross-connect module 54 determines STS links 72 selected by Ethernet interface 56 at step 114. For example, control module 80 of cross-connect module 54 may access link reservation information 84 to determine STS links 72 reserved for Ethernet port 70 identified in the cross-connect message and then identify the appropriate number of these reserved STS links 72. Alternatively, cross-connect module 54 may use other suitable techniques matched to the methods implemented by Ethernet interface 56 for selecting STS links 72. After determining the appropriate STS links 72, cross-connect modules couples these STS links 72 and the optical link identified in the cross-connect message, performing this coupling at step 116. This results in a communications path between the asynchronous network coupled to the identified Ethernet port 70 and synchronous transport resources of ring 18.

While this flowchart illustrates an exemplary method of operation, elements of node 12 may use any suitable techniques for coupling asynchronous networks to synchronous transport resources in response to provisioning and cross-connect messages. Therefore, many of the steps in this flowchart may take place simultaneously and/or in different orders than as shown. In addition, elements of node 12 may use methods with additional steps, fewer steps, and/or different steps, so long as the methods remain appropriate. Moreover, the examples provided by the illustrations and the preceding description are merely illustrative, and system 10 contemplates node 12 using any suitable equipment and/or methods for coupling an asynchronous network to synchronous transport resources in response to appropriate commands.

Although the present invention has been described in several embodiments, a myriad of changes and modifications may be suggested to one skilled in the art, and it is intended that the present invention encompasses such changes and modifications as followed in the scope of the present appended claims.

What is claimed is:

1. A communications apparatus comprising:
an optical interface having a plurality of optical links;
an Ethernet interface comprising a plurality of Ethernet ports, a plurality of synchronous transport signal (STS) links, and a control module operable to receive a provisioning message identifying a selected one of the Ethernet ports and, responsive to the provisioning message, to select one of the STS links and to couple the selected Ethernet port and the selected STS link; and
a cross-connect module coupled to the Ethernet interface and to the optical interface, the cross-connect module operable to receive a cross-connect message identifying the selected Ethernet port and a selected one of the optical links and, responsive to the cross-connect message, to determine the selected STS link based on the selected Ethernet port identified by the cross-connect message and to couple the selected STS link and the selected optical link, wherein the provisioning message and the cross-connect message result in a transport path, across a synchronous optical network, that links a first Ethernet network coupled to the selected Ethernet port and a second Ethernet network coupled to the synchronous optical network using an Ethernet port of a second communications apparatus.

2. The communications apparatus of claim 1, wherein:
the provisioning message indicates a bandwidth;
the control module is further operable, responsive to the provisioning message, to determine a number of STS links for providing the bandwidth, to select the number of the STS links, and to couple the selected Ethernet port and the selected STS links;
the cross-connect module is further operable, responsive to the cross-connect message, to determine the selected STS links based on the selected Ethernet port and the bandwidth and to couple the selected STS links and the selected optical link.

3. The communications apparatus of claim 1, wherein the control module maintains link reservation information mapping each of the Ethernet ports to at least one of the STS links, with the link reservation information mapping each of the STS links to no more than one of the Ethernet ports, and wherein the control module is further operable to select one of the STS links by accessing the link reservation information using the selected Ethernet port identified by the provisioning message.

4. The communications apparatus of claim 3, wherein the cross-connect module maintains a copy of the link reservation information, and wherein the cross-connect module is further operable to determine the selected STS link by accessing the copy of the link reservation information using the selected Ethernet port identified by the cross-connect message.

5. The communications apparatus of claim 1, wherein:
the control module receives the provisioning message from a transport element management system, the transport element management system generating the provisioning message in response to commands received from a trunk integrated record keeping system; and
the cross-connect module receives the cross-connect message from the transport element management system, the transport element management system generating the cross-connect message in response to commands received from the trunk integrated record keeping system.

6. The communications apparatus of claim 1, wherein coupling the selected Ethernet port and the selected STS link comprises translating between a synchronous transport protocol used for the STS links and an asynchronous transport protocol used for the Ethernet ports.

7. A method for provisioning synchronous transport resources for linking Ethernet networks comprising:
receiving a provisioning message that identifies a selected one of a plurality of Ethernet ports on an Ethernet interface;
selecting one of a plurality of synchronous transport signal (STS) links on the Ethernet interface;
coupling the selected Ethernet port and the selected STS link
receiving a cross-connect message that identifies the selected Ethernet port and an optical link;
determining the selected STS link based on the selected Ethernet port;
coupling the selected STS link and the optical link, such that asynchronous electrical traffic received at the selected Ethernet port is transmitted as synchronous optical traffic on the optical link, and synchronous optical traffic received at the optical link is transmitted as asynchronous electrical traffic on the selected Ethernet port, wherein the provisioning message and the cross-connect message result in a transport path, across a synchronous optical network, that links a first Ethernet network coupled to the selected Ethernet port and a second Ethernet network coupled to the synchronous optical network using an Ethernet port of a second communications apparatus.

8. The method of claim 7, wherein:
the provisioning message further identifies a bandwidth and the cross-connect message further identifies the bandwidth;
the method further comprising:
  responsive to the provisioning message, determining a number of STS links for providing the bandwidth, selecting the number of the STS links, and coupling the selected Ethernet port and the selected STS links; and
  responsive to the cross-connect message, determining the selected STS links based on the selected Ethernet port and the bandwidth and coupling the selected STS links and the selected optical link.

9. The method of claim 7, further comprising:
maintaining link reservation information in a first memory, the link reservation information mapping each of the Ethernet ports to at least one of the STS links, with the link reservation information mapping each of the STS links to no more than one of the Ethernet ports; and
selecting one of the STS links by accessing the link reservation information using the selected Ethernet port identified by the provisioning message.

10. The method of claim 9, further comprising:
maintaining a copy of the link reservation information in a second memory; and
determining the selected STS link by accessing the copy of the link reservation information using the selected Ethernet port identified by the cross-connect message.

11. The method of claim 7, further comprising:
receiving the provisioning message from a transport element management system, the transport element management system generating the provisioning message in response to commands received from a trunk integrated record keeping system; and
receiving the cross-connect message from the transport element management system, the transport element management system generating the cross-connect message in response to commands received from the trunk integrated record keeping system.

12. The method of claim 7, wherein coupling the selected Ethernet port and the selected STS link comprises translating between a synchronous transport protocol used for the STS links and an asynchronous transport protocol used for the Ethernet ports.

13. A method for provisioning synchronous transport resources for linking Ethernet networks comprising:
providing an Ethernet interface having a plurality of Ethernet ports and a plurality of synchronous transport signal (STS) links;
mapping each of the Ethernet ports to at least one of the STS links, with each of the STS links mapped to no more than one of the Ethernet ports;
receiving a provisioning message that identifies a selected one of the Ethernet ports and a bandwidth;
determining the number of the STS links for providing the bandwidth;
selecting the number of the STS links from the STS links mapped to the selected Ethernet port; and
coupling the selected Ethernet port and the selected STS links such that asynchronous traffic received at the selected Ethernet port is transmitted as synchronous traffic on at least one of the selected STS links, and synchronous traffic received at any of the selected STS links is transmitted as asynchronous traffic on the selected Ethernet port.

14. The method of claim 13, further comprising receiving the provisioning message from a transport element management system, the transport element management system generating the provisioning message in response to commands received from a trunk integrated record keeping system.

15. The method of claim 13, wherein the provisioning message permits a subsequently received cross-connect message identifying the selected Ethernet port to result in a link between the selected STS and an optical link of an optical interface.

16. The method of claim 13, wherein coupling the selected Ethernet port and the selected STS link comprises translating between a synchronous transport protocol used for the STS links and an asynchronous transport protocol used for the Ethernet ports.

17. Logic for provisioning synchronous transport resources for linking Ethernet networks, the logic encoded in media and operable when executed to:
receive a provisioning message that identifies a selected one of a plurality of Ethernet ports on an Ethernet interface;
select one of a plurality of synchronous transport signal (STS) links on the Ethernet interface;
couple the selected Ethernet port and the selected STS link
receive a cross-connect message that identifies the selected Ethernet port and an optical link;
determine the selected STS link based on the selected Ethernet port;
couple the selected STS link and the optical link, such that asynchronous electrical traffic received at the selected Ethernet port is transmitted as synchronous optical traffic on the optical link, and synchronous optical traffic received at the optical link is transmitted as asynchronous electrical traffic on the selected Ethernet port, wherein the provisioning message and the cross-connect message result in a transport path, across a synchronous optical network, that links a first Ethernet network coupled to the selected Ethernet port and a second Ethernet network coupled to the synchronous optical network using an Ethernet port of a second communications apparatus.

18. The logic of claim 17, wherein:
the provisioning message further identifies a bandwidth and the cross-connect message further identifies the bandwidth;
the logic further operable:
  responsive to the provisioning message, to determine a number of STS links for providing the bandwidth, to select the number of the STS links, and to couple the selected Ethernet port and the selected STS links; and
  responsive to the cross-connect message, to determine the selected STS links based on the selected Ethernet port and the bandwidth and to couple the selected STS links and the selected optical link.

19. The logic of claim 17, further operable to:
maintain link reservation information in a first memory, the link reservation information mapping each of the Ethernet ports to at least one of the STS links, with the link reservation information mapping each of the STS links to no more than one of the Ethernet ports; and
select one of the STS links by accessing the link reservation information using the selected Ethernet port identified by the provisioning message.

20. The logic of claim 19, further operable to:
maintaining a copy of the link reservation information in a second memory; and
determining the selected STS link by accessing the copy of the link reservation information using the selected Ethernet port identified by the cross-connect message.

21. The logic of claim 17, further operable to:
receive the provisioning message from a transport element management system, the transport element management system generating the provisioning message in response to commands received from a trunk integrated record keeping system; and
receive the cross-connect message from the transport element management system, the transport element management system generating the cross-connect message in response to commands received from the trunk integrated record keeping system.

22. The logic of claim 17, further operable to couple the selected Ethernet port and the selected STS link by translating between a synchronous transport protocol used for the STS links and an asynchronous transport protocol used for the Ethernet ports.

23. A communications apparatus comprising:
an optical interface having a plurality of optical links;
an Ethernet interface comprising a plurality of Ethernet ports, a plurality of synchronous transport signal (STS) links, and a control module operable to maintain link reservation information mapping each of the Ethernet ports to at least one of the STS links, with the link reservation information mapping each of the STS links to no more than one of the Ethernet ports; to receive a provisioning message identifying a selected one of the Ethernet ports and a bandwidth; and, responsive to the provisioning message, to determine a number of STS links for providing the bandwidth, to select the number of the STS links by accessing the link reservation information using the selected Ethernet port identified by the provisioning message, and to couple the selected Ethernet port and the selected STS links; and
a cross-connect module coupled to the Ethernet interface and to the optical interface, the cross-connect module operable to maintain a copy of the link reservation information; to receive a cross-connect message identifying the selected Ethernet port, the bandwidth, and a selected one of the optical links; and, responsive to the cross-connect message, to determine the selected STS links by accessing the copy of the link reservation information using the selected Ethernet port identified by the cross-connect message and to couple the selected STS link and the selected optical link.

24. A communications apparatus comprising:
means for receiving a provisioning message that identifies a selected one of a plurality of Ethernet ports on an Ethernet interface;
means for selecting one of a plurality of synchronous transport signal (STS) links on the Ethernet interface;
means for coupling the selected Ethernet port and the selected STS link
means for receiving a cross-connect message that identifies the selected Ethernet port and an optical link;
means for determining the selected STS link based on the selected Ethernet port
means for coupling the selected STS link and the optical link, such that asynchronous electrical traffic received at the selected Ethernet port is transmitted as synchronous optical traffic on the optical link, and synchronous optical traffic received at the optical link is transmitted as asynchronous electrical traffic on the selected Ethernet port, wherein the provisioning message and the cross-connect message result in a transport path, across a synchronous optical network, that links a first Ethernet network coupled to the selected Ethernet port and a second Ethernet network coupled to the synchronous optical network using an Ethernet port of a second communications apparatus.

25. A communications apparatus comprising:
means for providing an Ethernet interface having a plurality of Ethernet ports and a plurality of synchronous transport signal (STS) links;
means for mapping each of the Ethernet ports to at least one of the STS links, with each of the STS links mapped to no more than one of the Ethernet ports;
means for receiving a provisioning message that identifies a selected one of the Ethernet ports and a bandwidth;
means for determining the number of the STS links for providing the bandwidth;
means for selecting the number of the STS links from the STS links mapped to the selected Ethernet port; and
means for coupling the selected Ethernet port and the selected STS links such that asynchronous traffic received at the selected Ethernet port is transmitted as synchronous traffic on at least one of the selected STS links, and synchronous traffic received at any of the selected STS links is transmitted as asynchronous traffic on the selected Ethernet port.

26. An Ethernet interface for coupling to an optical interface having a plurality of optical links, the Ethernet interface comprising:
a plurality of Ethernet ports;
a plurality of synchronous transport signal (STS) links; and
a control module operable to:
map each of the Ethernet ports to at least one of the STS links, with each of the STS links mapped to no more than one of the Ethernet ports;
receive a provisioning message that identifies a selected one of the Ethernet ports and a bandwidth;
determine the number of the STS links for providing the bandwidth;
select the number of the STS links from the STS links mapped to the selected Ethernet port; and
couple the selected Ethernet port and the selected STS links such that asynchronous traffic received at the selected Ethernet port is transmitted as synchronous traffic on at least one of the selected STS links, and synchronous traffic received at any of the selected STS links is transmitted as asynchronous traffic on the selected Ethernet port.

27. The Ethernet interface of claim 26, wherein the control module is further operable to receive the provisioning message from a transport element management system, the transport element management system generating the provisioning message in response to commands received from a trunk integrated record keeping system.

28. The Ethernet interface of claim 26, wherein the provisioning message permits a subsequently received cross-connect message identifying the selected Ethernet port to result in a link between the selected STS and an optical link of an optical interface.

29. The Ethernet interface of claim 26, wherein the control module is further operable to couple the selected Ethernet port and the selected STS link by translating between a synchronous transport protocol used for the STS links and an asynchronous transport protocol used for the Ethernet ports.

* * * * *